May 3, 1927.

L. J. COLE 1,626,722

ACCELERATOR PEDAL

Filed Oct. 26, 1926

Inventor

L.J.Cole

By Lacey & Lacey, Attorneys

Patented May 3, 1927.

1,626,722

UNITED STATES PATENT OFFICE.

LEON J. COLE, OF GREENVILLE, PENNSYLVANIA.

ACCELERATOR PEDAL.

Application filed October 26, 1926. Serial No. 144,344.

This invention relates to automobile accessories and more particularly to a pedal adapted to be mounted upon the foot board of an automobile in overlying relation to the accelerator actuating plunger and facilitate operation of the plunger. At the present time many makes of automobiles are not provided with pedals to cooperate with the accelerator plunger while others are provided with pedals which allow the plunger to be easily located but have been found unsatisfactory as the foot will often slip off the pedal.

Therefore, one object of the invention is to provide a pedal which may be readily applied to a floor board in overlying relation to an accelerator plunger and upon which a foot may be placed without being liable to easily slip off the same. Another objection to pedals now in use is that it is necessary to provide springs or the like in order to prevent them from accidentally swinging rearwardly out of operative engagement with the plunger. The springs not only add to the cost but make the pedal more complicated in its construction and are liable to work loose or become broken.

It is, therefore, another object of the invention to provide a pedal which will be very simple in its construction and limited in its movement away from the plunger by an extended portion of a friction pad secured upon the upper face of the pad and adapted to engage a portion of the floor board when the pedal swings upwardly out of engagement with the plunger.

The invention is illustrated in the accompanying drawing, wherein—

Figure 1:
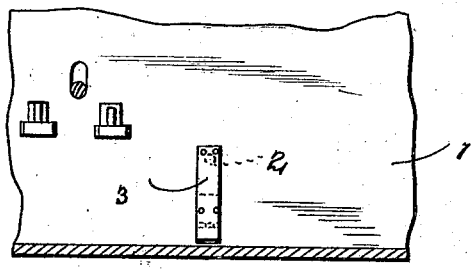
Figure 1 is a view showing a portion of an automobile floor board with the improved accelerator operating pedal applied thereto.
Figure 2:
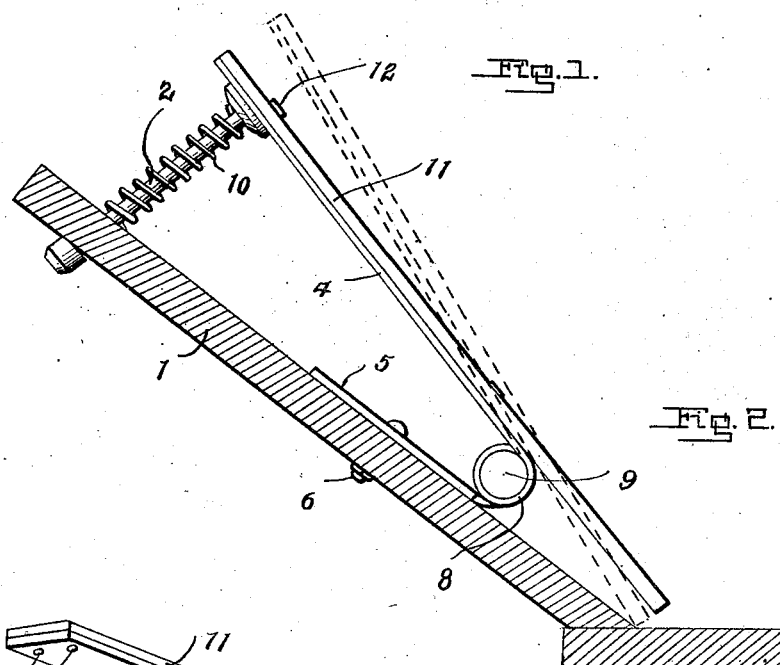
Fig. 2 is an enlarged view showing the floor board in section and the accelerator plunger and operating pedal in side elevation.
Figure 3:
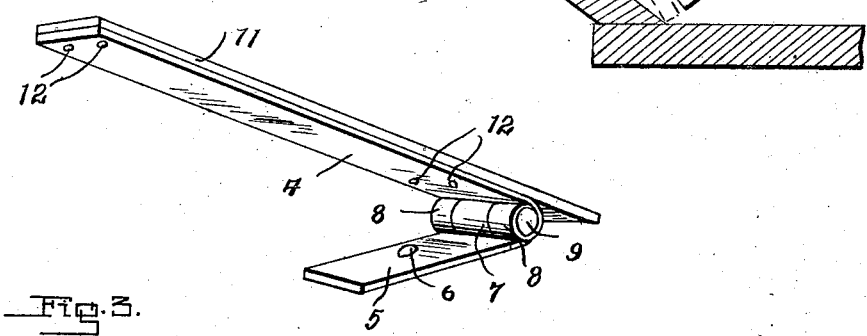
Fig. 3 is a perspective view of the pedal.

The pedal constituting the subject-matter of this invention is adapted to be applied to the floor board 1 of an automobile in covering relation to the accelerator plunger 2 and is usually mounted as shown in Fig. 1, although the angular relation of the pedal to the floor board may be varied if found more convenient. The pedal which in Fig. 1 is indicated in general by the numeral 3 includes companion leaves 4 and 5 which are preferably formed of steel, although other materials may be employed. The attaching leaf is firmly secured to the floor board by one or more securing bolts 6 and at its rear end is formed with a hinge ear or sleeve 7 disposed between hinge ears or sleeves 8 at the rear end of the leaf 4. A pin 9 extends through the ears 7 and 8, as clearly shown in Figs. 2 and 3, and pivotally connects the leaves so that the actuating leaf 4 may have vertical swinging movement and force the plunger 2 downwardly against the action of its spring 10 when pressure is applied to the pedal. In order to prevent the foot from readily slipping off the pedal, there has been provided a leather covering strip 11 which may be referred to as a friction pad. This strip is secured upon the upper face of the leaf 4 by rivets or other suitable fasteners 12 and is of such length that it projects rearwardly from the hinged connection between the two leaves. The rearwardly extending portion provides a rest for the heel of the operator and in addition constitutes a yieldable abutment adapted to contact with the floor board and limit upward swinging movement of the leaf 4. By referring to Fig. 2, it will be seen that, when the actuating leaf swings upwardly out of engagement with the accelerator plunger, its upward movement will be limited to the position indicated by dotted lines. When it reaches this position, contact of the rear end of the strip 11 with the floor board will prevent further upward swinging of the actuating leaf and the leaf will then return to its normal position in overlying relation to the accelerator plunger. Therefore, the pedal cannot be moved rearwardly out of operative engagement with the accelerator plunger and will at all times be retained in position for use. It will, therefore, be seen that the strip 11 constitutes means to prevent the pedal from moving out of operative engagement with the plunger as well as serving to prevent the foot from slipping off the pedal while driving an automobile. The device consists of a minimum number of parts, all of which are very simple in construction and are not liable to break or quickly wear out.

Having thus described the invention, I claim:

1. A pedal of the character described comprising an attaching leaf, an actuating leaf hinged to said attaching leaf and extending over said attaching leaf, said actuating leaf being of greater length than said attaching leaf, and a covering of yieldable material secured upon the upper face of said actuating leaf and projecting from the hinge end thereof and adapted to limit swinging of the actuating leaf away from the attaching leaf.

2. A pedal of the character described comprising an attaching leaf adapted to be secured upon a support, an actuating leaf pivoted to said attaching leaf and adapted to rest upon an article to be depressed when actuated, and a friction pad of yieldable material secured upon the upper face of said actuating leaf and projecting from the same for engagement with the support to limit upward swinging of the actuating leaf.

3. A pedal of the character described comprising a foot rest, means to pivotally connect said foot rest with a support with the foot rest extending forwardly from said means and adapted to rest upon a member to be depressed when pressure is applied to the foot rest, and a friction pad of yieldable material secured upon the upper face of said foot rest and projecting rearwardly therefrom for engagement with the support to limit upward swinging of the foot rest.

In testimony whereof I affix my signature.

LEON J. COLE. [L. S.]